March 16, 1954     M. R. KRASNO     2,672,564
DYNAMOELECTRIC MACHINE

Filed March 25, 1952     2 Sheets—Sheet 1

*Inventor*
Maxwell R. Krasno
By Jack M. Wiseman
*Attorney*

March 16, 1954 M. R. KRASNO 2,672,564
DYNAMOELECTRIC MACHINE
Filed March 25, 1952 2 Sheets-Sheet 2
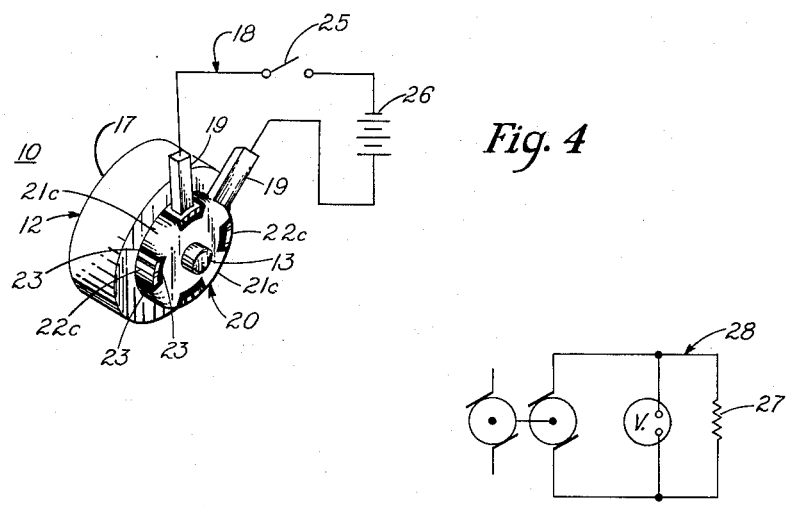
Fig. 4
Fig. 5
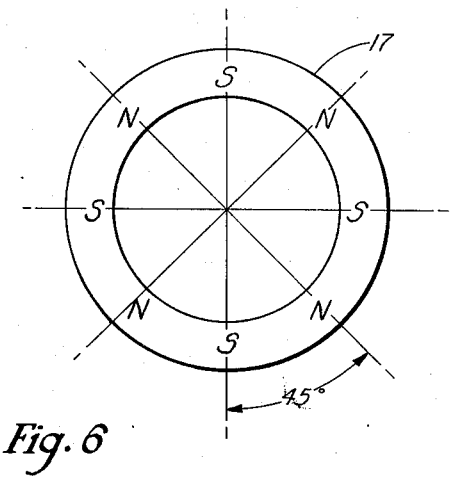
Fig. 6
*Inventor*
*Maxwell R. Krasno*
By *Jack M. Wiseman*
*Attorney*

Patented Mar. 16, 1954

2,672,564

UNITED STATES PATENT OFFICE 2,672,564

DYNAMOELECTRIC MACHINE

Maxwell R. Krasno, Waukesha, Wis., assignor to Raytheon Manufacturing Company, a corporation of Delaware Application March 25, 1952, Serial No. 278,446

12 Claims. (Cl. 310—46)

The present invention relates in general to a dynamo-electric machine, and more particularly to a dynamo-electric machine wherein a member thereof is used both as a pole piece and as a commutator.

In the manufacture of motors or generators, there is an apparent need for a small, simple and low cost direct current unit. To achieve these ends, it is necessary that a unit have the same part perform more than one function.

Accordingly, an important object of the present invention is to provide a dynamo-electric machine that requires a minimum number of parts by providing a member therein that is used both as a pole piece and as a commutator.

Another object of the present invention is to provide a small compact dynamo-electric machine by providing an insulated pole piece-commutator member of a suitable magnetic material connected to an armature winding and having an extension portion thereof plated with suitable conducting material to provide commutation and a flux path.

Other objects and features will appear upon further perusal of the detailed description taken in conjunction with the accompanying drawing in which:

Figure 4 is a perspective view of the dynamo-electric machine embodying the present invention and illustrating the electrical connections therewith for use as a motor;

Figure 5 is a schematic diagram illustrating a conventional electrical circuit utilizing the present invention as a generator;

Figure 6 is a side view of the field magnet structure.

Briefly described, a dynamo-electric machine is provided having a suitable armature shaft. A suitable core surrounds a portion of the armature shaft to carry the magnetic flux from pole to pole. In the preferred embodiment, the armature core is an electrically insulated powdered iron core. The core may also be a solid or laminated core that is suitably insulated electrically from either or both pole pieces by an air gap or other suitable means. Surrounding the armature core is a suitable armature coil which may be a single coil armature wound either scramble, layer or universal. For providing electrical connections between the revolving armature assembly and an external circuit, conventional brushes or stationary exterior members are provided. The armature structure, in the preferred embodiment, is suitably mounted inside of a hollow cylindrical field magnet structure having the interior surface thereof magnetized. The field magnetic structure is made of any suitable material, such as a single ring of Alnico, or a number of permanent magnets suitably arranged.

According to the invention, for providing a pole piece and commutator, a member is attached to the armature shaft and encompasses the armature coil. The pole piece-commutator member is made of any suitable material, such as soft iron, to enable it to function as a pole piece. In addition thereto, an extension portion thereof provides a surface for engaging the brushes. The brush engaging surface is plated or sprayed with copper or other suitable conducting material in order to provide a commutator contact surface.

In the preferred embodiment, the pole piece-commutator member is an annular member having the extending portions thereof substantially parallel to the armature shaft. Two similar pole piece-commutator members are intermeshed to provide an annular encased unit wherein the base portions of the pole piece-commutator members form parallel sides and the extended portions upon intermeshing form an enclosed annular portion. It is to be noted that the pole piece-commutator members are insulated from one another by suitable means, such as plastic, mica or air gaps. One pole piece-commutator member is electrically connected to one end of the armature coil, while the other pole piece-commutator member is electrically connected to the other end of the armature coil. In the preferred embodiment, to provide the insulation, after the shaft, core, winding, and pole piece-commutator members are assembled, the components are impregnated with plastic, which also functions as a cohesive agent.

Figure 1:
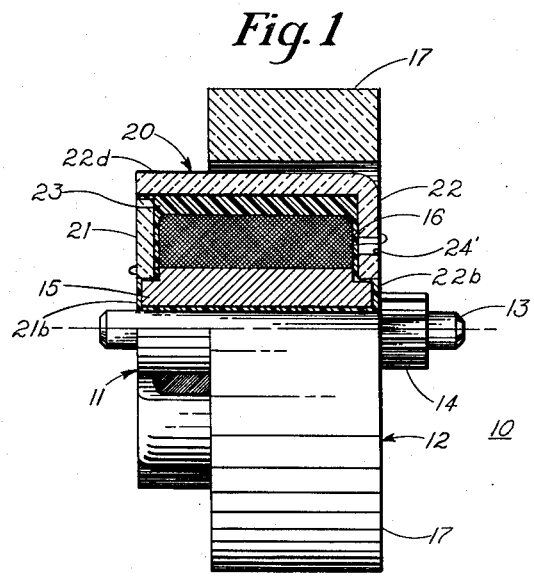
Figure 1 is a side elevational view of the dynamo-electric machine of the present invention with a portion thereof in section to illustrate the internal construction thereof.

Referring now to Figure 1 for a more detailed description, a dynamo-electric machine 10 is herein provided having an armature assembly 11 and a stator assembly 12.

The armature assembly 11 comprises a suitable armature shaft 13 having a gear wheel 14 thereon. The gear wheel 14 provides a driving mechanism, when the unit is coupled to another mechanism.

Attached to the rotatable armature shaft 13 to provide a flux path is a suitable armature core 15. The armature core 15 rotates with the armature 13 and in the preferred embodiment is an insulated powdered iron core. The core 15 may be a solid or a laminated core, and may be electrically insulated from either or both pole pieces by any suitable means, such as plastic or mica.

For providing armature windings or means subject to a magnetic field, an armature winding or coil 16 is herein provided which is wound around core 15. The coil 16 may be a simple single coil winding, wound either scramble, layer or universal. One of the advantages of the present invention over other direct current units is that the structure herein provided enables the use of only one coil that may be of any type that is easy to wind.

For providing a permanent magnetic field, the stator assembly 12 comprises suitable means, such as hollow cylindrical field magnet 17 having the internal surface thereof magnetized in a manner similar to that shown in Figure 6. The hollow cylindrical magnet 17, which may be made of any suitable magnetic material, encompasses the rotatable armature assembly 11. In lieu of a permanent magnet it is to be noted that suitable field windings may be provided which may be either series, compound, or shunt wound field coils.

In order to provide electrical connections between the rotatable armature assembly 11 and an external circuit 18, shown in Figure 4, conventional brushes 19 or stationary exterior members are provided.

According to the invention, a pole piece-commutator structure 20 is provided for performing two functions, namely: to provide a pole piece and in addition thereto to provide a commutator.

Figure 2:
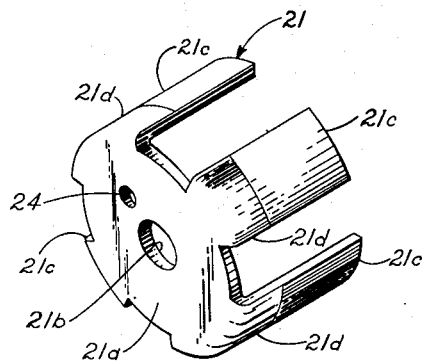
Figure 2 is a perspective view of the pole piece-commutator member.
Figure 3:
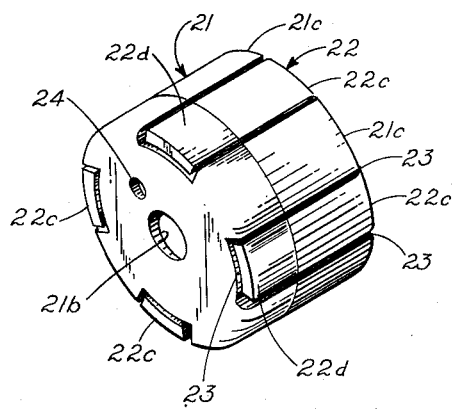
Figure 3 is a perspective view of two pole piece-commutator members having the extension portions thereof intermeshing.

Referring now to Figures 2 and 3, the pole piece-commutator structure comprises two similar pole piece-commutator members 21 and 22 made of suitable magnetic material, such as soft iron, to perform the function of a pole piece. In the preferred embodiment, pole piece-commutator members 21 and 22 are annularly shaped and have flat base portions 21a and 22a, respectively. The spaced parallel portions 21a and 22a are provided with apertures 21b and 22b, respectively, for suitably receiving the armature shaft 13 for mounting thereto. The pole piece-commutator members 21 and 22 are provided with integrally formed extension portions 21c and 22c, respectively, for engaging the brushes. The brush engaging extension portions 21c and 22c are substantially parallel to the armature shaft 13 and intermesh with one another to form an annular encased unit with the flat portions 21a and 22a forming spaced parallel side portions.

For providing brush contacting surfaces 21d and 22d, the extension portions 21c and 22c of the pole piece-commutator members 21 and 22 are suitably plated or sprayed with suitable material, such as copper, silver, gold, etc. In order that the pole piece-commutator members 21 and 22 be insulated from one another, so as to enable commutation, suitable insulating material 23, such as plastic or mica is positioned therebetween.

It is to be noted that when plastic insulation is desired, the armature structure 11, after the gear shaft 13, armature core 15, armature winding 16 and the pole piece-commutator members 21 and 22 are assembled, is impregnated with plastic and the plastic also acts as a cohesive agent, binding all these components into one solid cylindrical unit.

For establishing the electrical connections between the armature coil 16 and the pole piece-commutator members 21 and 22, one end of the armature winding 16 is received through an aperture 24 in the base portion 21a of the pole piece-commutator member 21 and is connected thereto by suitable means. The other end of the armature winding 16 is received through an aperture 24 in the base portion 22a of the pole piece-commutator member 22 and is connected thereto by suitable means.

Noteworthy are the advantages gained by the present invention. The simplicity of structure is its chief advantage over usual small direct current designs. Thus, only one coil is used in lieu of three or more and this coil is of the type that is easy to wind. In lieu of a large number of lamina in the pole piece structure in addition to a number of separate commutator bars, the pole piece-commutator structure of the present invention comprises only two similar stamped members.

Referring now to Figure 4, the dynamo-electric machine 10 is connected to the external circuit 18 to provide a direct current motor. A suitable starting switch 25 is serially connected to a suitable direct current source of energy, such as battery 26. Serially connected to the battery 26 and the switch 25 are the brushes 19. The brushes 19 engage the pole piece-commutator members 21 and 22 by means of the plated surfaces 21d and 22d on the integrally formed extension portions 21c and 22c, respectively. The pole piece-commutator members 21 and 22 are connected to the armature coil 16 in a manner previously described.

In operation, the starting switch 25 is closed to energize the armature coil 16 over the following path: battery 25, brushes 19, copper plated surfaces 21d and 22d, pole piece-commutator members 21 and 22, and the armature coil 16. The magnetic field produced by the current flow in the coil 16 in conjunction with the magnetic field 17 produces a torque to rotate the armature shaft 13, thus providing a motor action.

Referring now to Figure 5, which schematically illustrates the generator action. The load is shown by the resistor 27 in an external circuit 28. The resistor 27 is suitably connected to the brushes 19. In operation, conventional means are provided to impart rotation to the armature shaft 13 through the gear wheel 14. The rotation of the armature induces an electromotive force in the armature coil 16. The current flowing through the coil 16 is rectified by the pole piece-commutator members 21 and 22. The circuitry is completed through the brushes 19 to the conductors of the external circuit 28 to provide electrical energy to the load 27.

It is to be understood that variations and modifications may be effected without departing from the scope of the appended claims.

I claim:

1. In an armature assembly, a shaft for rotating said assembly, an armature winding in said assembly mounted on said shaft and rotatable therewith for providing a flux reaction, a core on said shaft encompassed by said armature winding for providing a flux path, and an insulated pole piece-commutator member encompassing said armature winding for providing a flux path and connected to said armature winding to provide commutation for said assembly.

2. An armature assembly comprising, a shaft for rotating said assembly, a core encompassing said shaft for providing a flux path, an armature winding wound around said core and rotatable therewith for providing a flux reaction for said assembly, and an insulated pole piece-commutator member encompassing said armature winding for providing a flux path and connected to said armature winding to provide commutation.

3. An armature assembly comprising, a shaft for rotating said assembly, an armature winding in said assembly mounted on said shaft and rotatable therewith for providing a flux reaction, a core on said shaft encompassed by said armature winding for providing a flux path, and a plurality of insulated pole piece-commutator members encompassing said armature winding for providing a flux path and connected to said armature winding to provide commutation for said assembly.

4. In a dynamo-electric machine, a field structure, an armature assembly, an armature winding in said armature assembly subject to the field produced by said field magnet structure, and an insulated pole piece-commutator member in said armature assembly providing a flux path for said armature assembly and connected to said armature winding for providing commutation.

5. In a dynamo-electric machine, a field magnet structure, a winding in said field magnet structure subject to the field produced by said field magnet structure, a stationary member for extending a connection from said armature assembly, and an insulated pole piece-commutator member in said assembly providing a flux path, connected to said winding for providing commutation and contacting said stationary member for extending a connection from said armature assembly.

6. In a dynamo-electric machine, a field magnet structure, an armature assembly, an armature winding in said armature assembly subject to the field produced by said field magnet structure, and a plurality of insulated pole piece-commutator members in said armature assembly providing a flux path for said armature winding and connected to said armature winding for providing commutation.

7. In a dynamo-electric machine, a field magnet structure, an armature assembly, a winding in said armature assembly subject to the field produced by said field magnet structure, a brush for extending a connection from said armature assembly, an insulated pole piece-commutator member in said armature assembly providing a flux path for said winding and connected to said winding for providing commutation, and a conducting surface on said pole piece-commutator member providing a contact surface for engaging said brush.

8. In a dynamo-electric machine, a field magnet structure, an armature assembly, a winding in said armature assembly subject to the field produced by said field magnet structure, stationary members for extending a connection from said armature assembly, a plurality of insulated pole piece-commutator members in said armature assembly providing a flux path for said armature assembly and connected to said winding for providing commutation, and a plurality of plated conducting surfaces on said pole piece-commutator members engaging said stationary members for providing a contacting surface therewith.

9. In a dynamo-electric machine, a field magnet structure, an armature assembly, a winding in said armature assembly subject to the field produced by said field magnet structure, a plurality of brushes for extending a connection from said armature assembly, an insulated pole piece-commutator member in said assembly providing a flux path for said winding and connected to said winding for providing commutation, and an extension portion on said insulated pole piece-commutator member engaging said brushes for establishing a connection therewith.

10. In a dynamo-electric machine, a field magnet structure, an armature assembly, a winding in said armature assembly subject to the field produced by said magnet structure, a plurality of brushes for extending a connection from said armature assembly, a plurality of insulated pole piece-commutator members in said armature assembly providing a flux path for said winding and connected to said winding for providing commutation, and a plurality of extension portions integrally formed with said pole piece-commutator members for establishing a connection therewith.

11. In a dynamo-electric machine, a hollow cylindrical field magnet structure, an armature assembly encompassed by said field structure, a plurality of brushes for extending a connection from said armature assembly, a winding in said armature assembly subject to the field produced by said field magnet structure, a plurality of insulated pole piece-commutator members in said armature assembly providing a flux path for said armature assembly and connected to said winding for providing commutation, a plurality of extension portions integrally formed with said pole piece-commutator members for engaging said brushes for establishing a connection therewith, and a conducting surface on each of said extension portions contacting said brushes to establish the connections.

12. In a dynamo-electric machine, a hollow cylindrical field magnet structure, an armature assembly encompassed by said field magnet structure, a winding in said armature assembly subject to the field produced by said field magnet structure, a plurality of brushes for extending a connection from said armature assembly, a plurality of insulated pole piece-commutator members in said armature assembly providing a flux path for said armature assembly and connected to said winding for providing commutation, a plurality of extension portions integrally formed with said insulated pole piece-commutator members intermeshing for providing an encased assembly and engaging said brushes for establishing a connection therewith, a conducting surface on each of said extension portions contacting said brushes to establish the connections, and an external circuit connected to said armature assembly by the connection established by said brushes.

MAXWELL R. KRASNO.

References Cited in the file of this patent

UNITED STATES PATENTS

| Number | Name | Date |
|---|---|---|
| 1,495,784 | Fereday | May 27, 1924 |
| 2,378,668 | Vickers | June 19, 1945 |
| 2,519,919 | Merrill | Aug. 22, 1950 |

FOREIGN PATENTS

| Number | Country | Date |
|---|---|---|
| 238,053 | Switzerland | Sept. 17, 1945 |